US012752512B2

(12) United States Patent
Tuominen et al.

(10) Patent No.: US 12,752,512 B2
(45) Date of Patent: Oct. 6, 2026

(54) MOULDED MULTI-LAYERED FIBROUS PRODUCT AND USE THEREOF

(71) Applicant: Metsä Spring Oy, Espoo (FI)

(72) Inventors: Jarkko Tuominen, Espoo (FI); Emilia Vänskä, Espoo (FI)

(73) Assignee: Metsä Spring Oy, Espoo (FI)

(*) Notice: Subject to any disclaimer, the term of this patent is extended or adjusted under 35 U.S.C. 154(b) by 305 days.

(21) Appl. No.: 18/566,103

(22) PCT Filed: Jun. 2, 2022

(86) PCT No.: PCT/FI2022/050377
§ 371 (c)(1),
(2) Date: Dec. 1, 2023

(87) PCT Pub. No.: WO2022/254094
PCT Pub. Date: Dec. 8, 2022

(65) Prior Publication Data

US 2024/0253328 A1 Aug. 1, 2024

(30) Foreign Application Priority Data

Jun. 2, 2021 (FI) ...................................... 20215642

(51) Int. Cl.
*B32B 5/26* (2006.01)
*B32B 5/18* (2006.01)
*B32B 7/022* (2019.01)

(52) U.S. Cl.
CPC .................. *B32B 5/26* (2013.01); *B32B 5/18* (2013.01); *B32B 7/022* (2019.01); *B32B 2262/062* (2013.01); *B32B 2305/022* (2013.01); *B32B 2307/72* (2013.01); *B32B 2307/7246* (2013.01); *B32B 2307/73* (2013.01)

(58) Field of Classification Search
CPC .. B32B 5/26; B32B 5/18; B32B 7/022; B32B 2262/062; B32B 2305/022; B32B 2307/72; B32B 2307/7246; B32B 2307/73
See application file for complete search history.

(56) References Cited

U.S. PATENT DOCUMENTS

2015/0284911 A1 10/2015 Juvonen et al.
2016/0016717 A1 1/2016 Toubeau
2017/0190159 A1 7/2017 Crooks et al.
2018/0245286 A1 8/2018 Oyj

FOREIGN PATENT DOCUMENTS

CA 2686462 A1 3/2006
CN 101031483 A 9/2007
CN 105829414 A 8/2016
CN 109803827 A 5/2019

(Continued)

*Primary Examiner* — Maria V Ewald
*Assistant Examiner* — Ethan Weydemeyer
(74) *Attorney, Agent, or Firm* — Laine IP Oy

(57) ABSTRACT

According to an example aspect of the present invention, there is provided a moulded multi-layered fibrous product comprising: a first fibrous layer comprising a cellulosic fibrous material; a second fibrous layer on top of the first fibrous layer, the second fibrous layer comprising a cellulosic fibrous material; and the first and/or the second fibrous layer exhibits barrier properties substantially throughout its structure.

20 Claims, 1 Drawing Sheet

(56) References Cited

FOREIGN PATENT DOCUMENTS

| | | | | | |
|---|---|---|---|---|---|
| CN | 112041159 | A | | 12/2020 | |
| EP | 1558813 | B1 | | 10/2012 | |
| EP | 2993204 | A1 | | 3/2016 | |
| JP | 2017190544 | A | | 10/2017 | |
| JP | 2018527476 | A | | 9/2018 | |
| JP | 2020512489 | A | | 4/2020 | |
| WO | WO WO2013160654 | A1 | | 10/2013 | |
| WO | WO WO20144080084 | A1 | | 5/2014 | |
| WO | WO WO2015036659 | A1 | | 3/2015 | |
| WO | WO WO2017046749 | A1 | | 3/2017 | |
| WO | WO WO2017144009 | A1 | | 8/2017 | |
| WO | WO WO2017179740 | A1 | | 10/2017 | |
| WO | WO WO2020016407 | A1 | | 1/2020 | |
| WO | WO WO2020110013 | A1 | | 6/2020 | |
| WO | WO WO2021002273 | A1 | | 1/2021 | |
| WO | WO WO2021016664 | A1 | | 2/2021 | |
| WO | WO-2021045195 | A1 | * | 3/2021 | ............. B65D 47/06 |
| WO | WO WO2021038504 | A1 | | 3/2021 | |
| WO | WO WO2021209915 | A1 | | 10/2021 | |
| WO | WO WO2021209916 | A1 | | 10/2021 | |

* cited by examiner

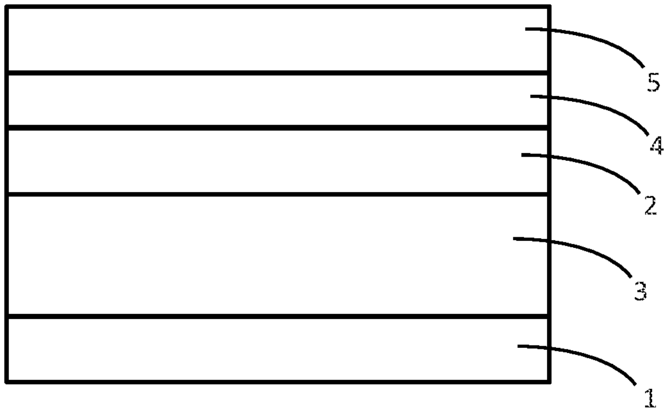
5
4
2
3
1

MOULDED MULTI-LAYERED FIBROUS PRODUCT AND USE THEREOF

FIELD

The present invention relates to moulded fibrous products, and more particularly to multi-layered moulded fibrous products.

BACKGROUND

In the known technology for preparing moulded fibrous products, foam is deposited to a basin-like mould with a headbox. Due to separate forming and pressing sequences the forming and dewatering processes are slow, and the foam may be spread unevenly to the mould. The method is suitable mainly for products like filters or insulators. Typically the obtained structures, such as egg trays, are porous and the surface is non-homogeneous and rough.

Another known alternative is to use water-forming processes to prepare moulded fibrous products, but these processes are only suitable for moulding a single, substantially thin-wall layer at a time, making the process cumbersome if a more complex structure is desired.

It is also known to apply various barrier coating films to packagings and containers made of two-dimensional fibrous materials, such as paperboard. Such barrier coatings typically involve use of plastic materials and films. Addition of the barrier coating needs to be carried out in a separate process after actual manufacturing of the fibrous substrate.

Separate barrier coating films suffer from many disadvantages related to adhesion of the coating film to the rest of the product, and deterioration of the mechanical properties of the coating film during drying steps in manufacturing or during moisture variation in transport and storage.

Particularly, ovenable food containers and packagings are currently made of paper or paperboard materials comprising plastic or wax-based barrier coatings on food contact side of the container, such as laminated or extruded barrier coatings made of polyethylene terephthalate or polyethylene.

It is an aim of the present invention to solve at least some of the problems present in the known technology.

SUMMARY OF THE INVENTION

The invention is defined by the features of the independent claims. Some specific embodiments are defined in the dependent claims.

According to a first aspect of the present invention, there is provided a moulded multi-layered fibrous product comprising: a first fibrous layer comprising a cellulosic fibrous material; a second fibrous layer on top of the first fibrous layer, the second fibrous layer comprising a cellulosic fibrous material; the first and/or the second fibrous layer exhibits barrier properties, preferably substantially throughout its structure.

Various embodiments of the first aspect may comprise at least one feature from the following bulleted list:

- The first fibrous layer forms the lowermost fibrous layer of the product in use.
- The second fibrous layer forms the uppermost fibrous layer of the product in use.
- The second fibrous layer is configured to be in direct contact with food or liquid.
- The barrier properties include one or more of the following: oil and grease resistance, water resistance, water vapour resistance, aroma resistance, gas resistance, oxygen resistance.
- The first and/or the second fibrous layer is oil and grease resistant substantially throughout its structure.
- The first and/or the second fibrous layer is water-resistant substantially throughout its structure.
- The first and/or the second fibrous layer is water vapour resistant substantially throughout its structure.
- The cellulosic fibrous material comprises one or more of the following: chemical wood pulp, mechanical wood pulp, fibrillated cellulose, such as microfibrillated cellulose, nanocellulose, and any other cellulosic material comprising cellulosic fibres or parts of cellulosic fibres.
- The cellulosic fibrous material comprises bleached or unbleached chemical pulp, such as bleached or unbleached softwood chemical pulp and/or bleached or unbleached hardwood chemical pulp.
- The cellulosic fibrous material comprises bleached or unbleached chemithermomechnical pulp.
- The cellulosic fibrous material of the first and/or the second fibrous layer comprises bleached or unbleached softwood chemical pulp and bleached or unbleached hardwood chemical pulp, such as 80 to 95 wt-% bleached or unbleached softwood chemical pulp and 5 to 20 wt-% bleached or unbleached hardwood chemical pulp.
- The product further comprises between the first and the second fibrous layers one or more inner fibrous layers.
- Each inner fibrous layer comprises a cellulosic fibrous material, preferably comprising mechanical pulp, such as bleached chemithermomechanical pulp (BCTMP).
- The uppermost and/or the lowermost fibrous layers comprise bleached chemical pulp.
- One or more of the fibrous inner layers, if present, comprise mechanical pulp, and optionally chemical pulp.
- The uppermost fibrous layer comprises refined softwood and/or hardwood chemical pulp.
- The lowermost fibrous layer comprises softwood and/or hardwood chemical pulp, preferably hardwood chemical pulp, typically refined hardwood chemical pulp.
- The second fibrous layer forms the uppermost fibrous layer of the product.
- The second fibrous layer has a higher oil and grease resistance and/or a higher water-resistance and/or a higher water vapour resistance than the fibrous layer below it.
- The first fibrous layer forms the lowermost fibrous layer of the product.
- The first fibrous layer has a higher water-resistance and/or a higher water vapour resistance than the fibrous layer above it.
- The cellulosic fibrous material of the first and/or the second fibrous layer comprises cellulosic fibres which have been refined to a Schopper-Riegler number that is larger than 40, such as larger than 70, such as larger than 80.
- The Schopper-Riegler number of the lowermost fibrous layer and/or one or more inner fibrous layers of the product is less than 50, such as less than 40, such as less than 30.
- The density of the second fibrous layer is larger than the density of the fibrous layer below it, preferably the density of the second fibrous layer is in the range 300 to 1,000 kg/m$^3$, such as 600 to 950 kg/m$^3$, such as larger than 800 kg/m$^3$, calculated as dry solids weight per volume.

The density of one or more inner fibrous layers of the product is less than 600 kg/$m^3$, such as less than 500 kg/$m^3$.

At least one of the fibrous layers, preferably at least the first and/or the second fibrous layer, comprises one or more of the following additives: pigments, colorants and fillers, such as talc, clay or kaolin, ground calcium carbonate, precipitated calcium carbonate, and titanium dioxide; barrier agents, such as dispersion barrier agents; latex binders; water-soluble binders, such as PVA, starch, and CMC; sizes, such as AKD.

At least one of the fibrous layers, preferably at least the first and/or the second fibrous layer, comprises PVA.

At least one of the fibrous layers, preferably at least the first and/or the second fibrous layer, comprises AKD, ASA or resin adhesive, preferably AKD.

At least one of the first and/or the second fibrous layers comprises barrier agents, preferably at least 0.5 wt-%, such as at least 1 wt-%, which provide said barrier properties throughout the structure of the fibrous layer.

The product has a dry grammage in the range of 5 to 900 g/$m^2$, for example in the range of 100 to 800 g/$m^2$, such as in the range of 200 to 600 g/$m^2$.

The uppermost and/or the lowermost fibrous layer of the product has a dry grammage in the range of 50 to 200 g/$m^2$, such as 80 to 150 g/$m^2$.

The uppermost and/or the lowermost fibrous layer of the product has a dry grammage in the range of 20 to 80 g/$m^2$, such as 30 to 50 g/$m^2$.

Each of the fibrous layers of the product has been obtained by either foam forming or water forming in a mould, preferably by foam forming.

At least one, such as at least two, preferably at least three fibrous layers of the product have been obtained by foam forming.

At least the fibrous layer exhibiting barrier properties has been obtained by a foam forming method in a mould.

The product is a three-dimensional moulded multi-layered fibrous product, obtained by using a mould comprising at least one three-dimensional, non-planar mould surface, wherein said product exhibits a three-dimensional shape conforming to the shape of said three-dimensional, non-planar mould surface.

The product is a food or liquid packaging or a food or liquid serving product, such as a cup for liquid, or a food tray.

According to a second aspect of the present invention, there is provided use of the moulded multi-layered fibrous product according to the first aspect as a food or liquid packaging or a food or liquid serving product or as a part thereof.

According to a third aspect of the present invention, there is provided use of the moulded multi-layered fibrous product according to the first aspect in packaging, storing, serving, cooking and/or heating of food or liquid.

According to a fourth aspect of the present invention, there is provided a moulded multi-layered fibrous product obtained by a method comprising: forming a moulded single- or multi-layered foamed fibrous structure from at least one foamed fibrous composition comprising cellulosic fibres, water, air and a foaming agent; dewatering the structure, preferably by applying a vacuum; hot-pressing the dewatered structure, optionally with further fibrous layers, to obtain the moulded multi-layered fibrous product, wherein at least one of the fibrous layers of the multi-layered fibrous product exhibits barrier properties substantially throughout its structure.

Various embodiments of the fourth aspect may comprise at least one feature from the following bulleted list:

At least one of the foamed fibrous compositions comprises barrier agents to provide said barrier properties.

Said step of forming a moulded single- or multi-layered foamed fibrous structure comprises: providing a first fibrous composition; providing a second fibrous composition, optionally comprising refining the cellulosic fibres of the second fibrous composition, preferably to a Schopper-Riegler number that is larger than 40, such as larger than 70; feeding a first fibrous composition in a foamed form into the mould, and shaping said first fibrous composition in the mould, to prepare a first foamed fibrous layer, feeding a second fibrous composition in a foamed form into the mould, and shaping said second fibrous composition in the mould, to prepare a second foamed fibrous layer, to obtain a two-layered moulded foamed fibrous structure, wherein said first foamed fibrous layer becomes located either on top of or under the second foamed fibrous layer in the mould, and wherein said feeding steps can be carried out in either order.

Said feeding into the mould comprises feeding the fibrous composition in a foamed form into an inner space/volume of the mould, wherein said inner space is limited by inner surfaces of the mould.

Said feeding into the mould comprises feeding the fibrous composition in a foamed form into a closed cavity of the mould.

Said shaping comprises pressing said fibrous composition in the inner space of the mould by making parts of the mould to approach each other.

According to a fifth aspect of the present invention, there is provided an ovenable moulded multi-layered fibrous product comprising: a first fibrous layer comprising a cellulosic fibrous material; a second fibrous layer on top of the first fibrous layer, the second fibrous layer comprising a cellulosic fibrous material; and wherein the first and/or the second fibrous layer exhibits barrier properties substantially throughout its structure, and wherein the product is configured for heating food or liquid thereon to at least 100° C., preferably to at least 220° C.

Various embodiments of the fifth aspect may comprise at least one feature from the following bulleted list:

The product further comprises a non-fibrous release layer on top of the second fibrous layer and forming the uppermost layer of the product in use, and the non-fibrous release layer is configured to be in direct contact with the food or liquid and to facilitate releasing of the food or liquid from the product after being heated thereon.

Said non-fibrous release layer comprises a silicone composition.

The dry grammage of the non-fibrous release layer is 0.5 to 2.5 g/$m^2$, such as less than 2.0 g/$m^2$.

The first fibrous layer forms the lowermost fibrous layer of the product in use and the second fibrous layer forms the uppermost fibrous layer of the product in use.

The barrier properties include one or more of the following: oil and grease resistance, water resistance, water vapour resistance, aroma resistance, gas resistance, oxygen resistance.

The first and/or the second fibrous layer is oil and grease resistant substantially throughout its structure.

The first and/or the second fibrous layer is water-resistant and/or water vapour resistant substantially throughout its structure.

- The product further comprises between the first and the second fibrous layers one or more inner fibrous layers, each comprising a cellulosic fibrous material.
- The second fibrous layer forms the uppermost fibrous layer of the product and has a higher oil and grease resistance than the fibrous layer below it.
- The first fibrous layer forms the lowermost fibrous layer of the product and has a higher water-resistance and/or higher water vapour resistance than the fibrous layer above it.
- The cellulosic fibrous material of the fibrous layers of the product comprise or consist of bleached chemical wood pulp, preferably bleached softwood chemical wood pulp and/or bleached hardwood chemical wood pulp.
- The cellulosic fibrous material of the first and/or the second fibrous layer comprises cellulosic fibres, preferably comprising softwood chemical wood pulp, which have been refined to a Schopper-Riegler number that is larger than 40, such as larger than 70, such as larger than 80.
- The Schopper-Riegler number of the lowermost fibrous layer and/or one or more inner fibrous layers of the product is less than 50, such as less than 40, such as less than 30.
- The density of the second fibrous layer is larger than the density of the fibrous layer below it, preferably the density of the second fibrous layer is in the range 300 to 1,000 kg/m$^3$, such as 600 to 950 kg/m$^3$, such as larger than 800 kg/m$^3$, calculated as dry solids weight per volume.
- The density of the lowermost fibrous layer and/or one or more inner fibrous layers of the product is less than 600 kg/m$^3$, such as less than 500 kg/m$^3$.
- At least one of the fibrous layers, preferably at least the second fibrous layer, comprises one or more of the following additives: pigments, barrier agents, binders, sizes, such as AKD.
- At least one of the fibrous layers, preferably at least the second fibrous layer, comprises MFC and starch.
- The product has a dry grammage in the range of 5 to 900 g/m$^2$, for example in the range of 100 to 900 g/m$^2$, such as in the range 300 to 600 g/m$^2$, such as in the range of 200 to 400 g/m$^2$.
- The uppermost and/or the lowermost fibrous layer of the product has a dry grammage in the range of 20 to 80 g/m$^2$, such as 30 to 50 g/m$^2$.
- The uppermost and/or the lowermost fibrous layer of the product has a dry grammage in the range of 50 to 150 g/m$^2$.
- The product is a three-dimensional moulded multi-layered fibrous product, obtained by using a mould comprising at least one three-dimensional, non-planar mould surface, wherein said product exhibits a three-dimensional shape conforming to the shape of said three-dimensional, non-planar mould surface, and wherein preferably the product has been obtained by a foam-forming or a water-forming method in a mould.
- The product is an ovenable or micro-ovenable food or liquid packaging or container or tray, or a container for baking or cooking, such as an ovenable pan.

According to a sixth aspect of the present invention, there is provided use of the ovenable moulded multi-layered fibrous product according to the fifth aspect in baking, cooking and/or heating of food or liquid.

According to a seventh aspect of the present invention, there is provided a moulded multi-layered fibrous product obtained by a method comprising: forming a moulded multi-layered foamed fibrous structure from at least one foamed fibrous composition comprising cellulosic fibres, water, air and a foaming agent; dewatering the structure, preferably by applying a vacuum; hot-pressing the dewatered structure to obtain the moulded multi-layered fibrous product, wherein at least one of the foam-formed fibrous layers of the multi-layered fibrous product exhibits barrier properties substantially throughout its structure.

Various embodiments of the seventh aspect may comprise at least one feature from the following bulleted list:

- Said step of forming a moulded multi-layered foamed fibrous structure comprises: providing a first fibrous composition; providing a second fibrous composition, comprising refining the cellulosic fibres of the second fibrous composition, preferably to a Schopper-Riegler number that is larger than 40, such as larger than 70; feeding a first fibrous composition in a foamed form into the mould, and shaping said first fibrous composition in the mould, to prepare a first foamed fibrous layer, feeding a second fibrous composition in a foamed form into the mould, and shaping said second fibrous composition in the mould, to prepare a second foamed fibrous layer, to obtain a two-layered moulded foamed fibrous structure.
- Said first foamed fibrous layer becomes located either on top of or under the second foamed fibrous layer in the mould, and said feeding steps can be carried out in either order.
- Said hot-pressing comprises two or more successive hot-pressing steps.
- Said hot-pressing has a total duration of less than 30 seconds, such as less than 20 seconds.

Advantages of the Invention

The present invention may avoid the need for a separate non-fibrous barrier coating layer. Problems related to coating adhesion may be avoided.

The present invention may enable fast preparation of multi-layered moulded fibrous products. The cycle times may be shorter. The wetting or rewetting of the product due to separate coating steps may be avoided.

The present invention may enable facile tailoring of the properties of the individual layers.

The present invention may enable obtaining light-weight, bulkier and homogeneous multi-layered moulded fibrous products. Costs due to logistics and transport may be reduced as the product is light-weight.

The present invention may avoid separate converting steps and converting logistics.

In the present products, the distribution of the cellulosic fibres may be more even.

In the present invention, fibre flocculation and cloudy appearance may be avoided or reduced.

The present invention may avoid use of separate plastic barrier coatings.

The present invention may provide biodegradable, compostable and recyclable multi-layered moulded fibrous products that are ovenable and/or micro-ovenable.

The present invention may reduce energy consumption due to reduced need of dewatering and drying of the product, particularly when using foam forming.

The present invention may reduce production costs related to cycle time, dewatering, drying, and chemicals. Chemical retention may be enhanced particularly when using foam forming.

The present invention may provide fibrous products with good barrier properties.

The present invention may provide fibrous products in complex geometries without creases and cracks.

The present invention may provide plastic-free fibre packaging that are recyclable in existing fibre recycling infrastructures.

The present invention may enable replacing existing, often plastic-based, packaging solutions.

BRIEF DESCRIPTION OF THE DRAWINGS

FIG. 1 schematically illustrates a multi-layered fibrous product in accordance with at least some embodiments of the present invention.

EMBODIMENTS

Unless otherwise stated herein or clear from the context, any percentages referred to herein are expressed as percent by weight based on a total dry weight of the respective composition or layer.

In the present context, 'resistant', such as water resistant, means that the material or layer resists penetration of the substance in question. In a preferred embodiment, the material or layer exhibits 'repellency', such as water repellency, which means that the substance in question cannot easily penetrate the material or layer. In a more preferred embodiment, the material or layer exhibits 'proofness', such as water-proofness, which means that the substance in question cannot penetrate the material or layer during typical use of a product comprising said material or layer. In other words, resistance to penetration of the substance in question increases in the order 'resistant'<'repellent'<'proof'.

Also in the present context, any reference to 'resistant' means 'at least resistant', i.e. the material or layer may also exhibit repellency and even proofness.

In the present context, the expression "the layer exhibits barrier properties" typically means that the layer has been configured, such as modified or tailored, for having an increased resistance against penetration and/or migration of a particular (determined) substance or group of substances. Such a layer exhibiting barrier properties is thus configured to form a barrier against penetration and/or migration of said determined substance(s).

In the present context, the expression "the layer exhibits barrier properties substantially throughout its structure" implies that the barrier property is not confined to only a minor part, such as less than 50%, of the volume of the layer, such as to a thin surface part of the layer.

In the present context, the term "hot pressing" typically refers to a method of applying increased pressure and increased temperature for a period of time. Hot pressing may involve several successive cycles or steps of applying increased pressure and temperature. In some instances, hot pressing may involve application of sub-atmospheric pressure.

In the present context, the term "moulded product" refers to a product obtained by shaping a product or giving a product a shape inside a closed or closable cavity of a mould. Typically, "moulding" does not refer to mere pressing of a product between two plates.

In the present context, the term "ovenable product" refers to a product which is configured to being heated in an oven, typically while holding or carrying food or liquid for human or animal consumption.

In the present context, the term "food" typically refers to food for human or animal consumption.

In the present context, the term "liquid" typically refers to a liquid or flowable material for human or animal consumption, such as beverage.

The present invention provides new moulded fibrous products with improved barrier properties. At least part of the product may be manufactured by a foam-based process. Foam forming advantageously enables preparation of moulded multi-layer structures and tailoring of the properties of the individual layers.

The products are typically three-dimensional moulded multilayered products obtained by using a foam-forming process.

Preferably, at least one of the fibrous layers prepared by foam forming exhibits improved barrier properties. Said at least one of the fibrous layers may function as a barrier against oil, grease, fat, water, water vapour, liquid, aroma, gas and/or oxygen.

According to the present invention, the product is a moulded multi-layered fibrous product comprising: a first fibrous layer comprising a cellulosic fibrous material; a second fibrous layer on top of the first fibrous layer, the second fibrous layer comprising a cellulosic fibrous material; and wherein the first and/or the second fibrous layer exhibits barrier properties substantially throughout its structure. In a preferred embodiment, the product is configured for heating food or liquid thereon to at least 100° C., preferably to at least 220° C.

The cellulosic fibrous material may comprise wood pulp selected from the following group: chemical pulp, mechanical pulp, and any combinations thereof.

The cellulosic fibrous material may comprise one or more of the following: chemical wood pulp, mechanical wood pulp, such as chemithermomechanical wood pulp, fibrillated cellulose, such as microfibrillated cellulose, nanocellulose, and any other cellulosic material comprising cellulosic fibres or parts of cellulosic fibres.

The cellulosic fibrous material may also comprise non-wood pulp, such as straw pulp.

In some embodiments, the cellulosic fibrous material comprises or substantially consists of virgin wood pulp, such as virgin bleached chemical pulp that is substantially free from lignin, which makes the product particularly suitable for cooking, heating, food contact, for example for micro-ovening.

In an embodiment, at least 90 wt-%, such as at least 95 wt-% of the cellulosic fibrous material of the product consists of virgin cellulosic fibres, such as virgin wood pulp.

An advantage of virgin pulp is that it is free from pigments and other undesired chemicals. Recycled waste materials often contain chemical and microbiological contaminants, which may affect their safe use. Mixtures of chemical compounds and microbial products may leach out from recycled materials and cause a variety of negative health or environmental impacts. Not only the harmfulness of individual chemical compounds, but also their interactions with other chemical compounds and microbial products may increase the toxicity of recycled materials and their emissions. Therefore, the present invention preferably avoids use of recycled materials.

An advantage of chemical pulp, such as bleached chemical pulp, is that it is substantially free from lignin. A further advantage of chemical pulp is that inter-fibre bonding in the end product may be better than in the case of mechanical pulp.

Lignin-containing pulps often have an insufficient organoleptic quality for direct food contact. In addition, lignin-containing pulps are sensitive for ageing and yellowing of the material.

In one embodiment, the cellulosic fibrous material of the second fibrous layer comprises bleached softwood chemical pulp and bleached hardwood chemical pulp, such as 80 to 95 wt-% bleached softwood chemical pulp and 5 to 20 wt-% bleached hardwood chemical pulp.

In one embodiment, the cellulosic fibrous material of the second fibrous layer comprises 50 to 95 wt-% bleached softwood chemical pulp.

In one embodiment, the cellulosic fibrous material of the second fibrous layer comprises 5 to 50 wt-% bleached hardwood chemical pulp.

In one embodiment, the cellulosic fibrous material of the second fibrous layer comprises or consists of bleached softwood chemical pulp.

In one embodiment, the cellulosic fibrous material of the second fibrous layer comprises or consists of bleached hardwood chemical pulp.

The barrier properties may include one or more of the following: oil and grease resistance, water resistance, water vapour resistance, aroma resistance, gas resistance, oxygen resistance, thermal resistance.

Preferably, the barrier properties comprise water-resistance, typically exhibited by the uppermost fibrous layer.

Preferably, the barrier properties, such as oil and/or grease resistance of the fibrous layer is obtained by means of a mechanical treatment of the fibres. The mechanical treatment may be a treatment of the fibres in the fibre furnish, which treatment is configured for increasing the density of the layer to be formed, such as a treatment that increases the Schopper-Riegler number of the fibres. The Schopper-Riegler value can be obtained by the standard method EN ISO 5267-1.

In an embodiment, the barrier properties are provided to the fibrous layer by incorporating mechanically treated cellulosic and/or lignocellulosic fibres, such as mechanically produced MFC (microfibrillated cellulose), NFC (nanofibrillated cellulose) or gluepulp.

The first fibrous layer may form the lowermost fibrous layer of the product in use and the second fibrous layer may form the uppermost fibrous layer of the product in use. For example, when the product is a container, the contents of the container are contacting the uppermost layer of the product while the lowermost layer is farthest from the contents and typically rests on a surface.

The uppermost fibrous layer may still be coated by one or more non-fibrous layers, which would then form the uppermost layers of the product.

Similarly, the lowermost fibrous layer may lie above one or more non-fibrous layers, which would then form the lowermost layers of the product.

Where the product is a container or holder or support structure, the second fibrous layer may be configured to be in direct contact with contents of the container or holder or support structure.

The second fibrous layer may be configured to be in direct contact with food or liquid or beverage or at least to form the fibrous layer that is nearest to food, liquid or beverage. Food, beverages and liquids often contain oil, grease and/or water, the penetration of which into the fibrous layers of the product needs to be avoided.

Preferably, the first and/or the second fibrous layer, particularly the second fibrous layer, is oil and grease resistant substantially throughout its structure. Alternatively or in addition, the first and/or the second fibrous layer, particularly the second fibrous layer, is water-resistant substantially throughout its structure.

In one embodiment, the oil and grease resistance OGR of the product or the fibrous layer is measured by ASTM F119, with olive oil at 60° C., and is in the level 'moderate' or better.

In one embodiment, the moisture transmission of the product or the fibrous layer is measured by ISO 2528 and ASTM E96, at standard conditions 23° C. and 50% RH, and is in the level 'moderate' or less.

In one embodiment, the water absorption on barrier side of the product is measured by ISO 535, Cobb value after 3 min, and is in the level 'moderate' or less.

The first fibrous layer may be configured to be in direct contact with an external surface on which the product rests.

Typically, the first fibrous layer forms the lowermost fibrous layer of the product and has a lower oil and grease resistance than the second fibrous layer. The lowermost fibrous layer of the product is typically not configured to be in direct contact with oily substances, such as food.

In one embodiment, the lowermost fibrous layer of the product is resistant against water and/or water vapour. Such barrier properties may be desirable for example during storage and transport of the product, to protect it from direct contact with ambient water and moisture.

The product may comprise between the first and the second fibrous layers one or more, such as 1 to 10 inner fibrous layers, each comprising a cellulosic fibrous material, preferably comprising chemical pulp, such as softwood pulp, and/or mechanical pulp, such as bleached chemi-thermomechanical pulp (BCTMP). Products intended to be heated or stored in hot environments preferably are free from mechanical pulp.

In an embodiment, the product comprises three fibrous layers, i.e. the first and the second fibrous layers and a single inner fibrous layer between them.

In one embodiment, the product is an ovenable product. Preferably the product comprises one or more inner layers comprising or consisting of mechanical pulp, such as BCTMP.

The uppermost and/or the lowermost fibrous layers may comprise bleached chemical pulp.

One or more of the inner fibrous layers may comprise mechanical pulp.

The barrier properties of the product, particularly its fibrous layers, may be enhanced by various methods.

In one example, refining of the fibrous starting material is used for increasing the density of the end product and to obtain barrier properties to the desired layer.

The uppermost fibrous layer may comprise refined wood pulp, such as refined softwood chemical pulp, refined hardwood chemical pulp, such as refined birch or *eucalyptus* chemical pulp, or any combination thereof. The pulp is preferably bleached.

The cellulosic fibrous material of the second fibrous layer may comprise cellulosic fibres which have been refined to a Schopper-Riegler number that is larger than 40, such as larger than 60, for example larger than 70, such as larger than 80.

The cellulosic fibrous material of the lowermost fibrous layer and/or the inner fibrous layers may comprise cellulosic fibres which either are unrefined or have been refined less than said refined cellulosic fibres of the uppermost fibrous layer.

For example, the Schopper-Riegler number of the lowermost fibrous layer and/or one or more inner fibrous layers of the product may be less than 60, for example less than 50, such as less than 20, for example in the range 10 to 30.

For example, the Schopper-Riegler number of the lowermost fibrous layer and/or one or more inner fibrous layers of the product may be 10 to 50.

For example, the Schopper-Riegler number of the uppermost fibrous layer may be more than 40, such as more than 50.

For example, the Schopper-Riegler number of the lowermost fibrous layer may be more than 10, such as more than 15.

In an embodiment, the density of each fibrous layer is larger than 100 kg/m$^3$.

In some embodiments, the density of the second fibrous layer is larger than the density of the first fibrous layer. In an embodiment, the density of the second fibrous layer is larger than 100 kg/m$^3$. Preferably the density of the second fibrous layer is in the range 300 to 1,000 kg/m$^3$, such as 500 to 950 kg/m$^3$, such as larger than 600 kg/m$^3$, calculated as dry solids weight per volume.

Preferably the density of the first fibrous layer is less than 500 kg/m$^3$, such as less than 400 kg/m$^3$, for example less than 300 kg/m$^3$ and the density of the second fibrous layer is larger than 500 kg/m$^3$, such as larger than 800 kg/m$^3$.

The density of the second fibrous layer may be substantially homogeneous throughout its structure.

In another example, suitable additives or chemicals are added to the fibrous starting material to provide the end product, such as a particular fibrous layer of the end product, with barrier properties.

Both refining and addition of barrier agents may be utilized for achieving barrier properties in particular fibrous layer or layers.

Any of the fibrous layers of the product may be provided with barrier properties by refining the fibres and/or by adding barrier additives. Different barrier properties may be provided to the fibrous layers. For example, one of the fibrous layers may exhibit oil and grease resistance while another fibrous layer may exhibit water-resistance.

The additives or chemicals are preferably added to the fibrous furnish or slush before the foam forming step, at a consistency of for example 0.5 to 15%, such as 2 to 10%, or alternatively, before foam forming, to the foam to be mixed with the fibrous slush with said consistency.

The additives or chemicals are preferably added to the fibrous furnish or slush at a consistency of less than 5%, such as less than 2%.

At least one of the fibrous layers, such as the first and/or the second fibrous layer may comprise one or more of the following additives: pigments, such as talc, clay, and calcium carbonate; barrier agents; latex binders; water-soluble binders, such as PVA, starch, and CMC; sizes, such as AKD.

The amount of the additives may be in the range 0.01 to 30 wt-%, such as 0.01 to 10 wt-%, such as 0.1 to 8 wt-%, for example 1 to 5 wt-%, calculated from the total dry weight of the fibrous layer.

In one embodiment, at least one of the fibrous layers, such as the second fibrous layer comprises 0.1 to 5 wt-% talc.

In one embodiment, at least one of the fibrous layers, such as the second fibrous layer comprises 0.1 to 5 wt-% clay.

In one embodiment, at least one of the fibrous layers, such as the second fibrous layer comprises 0.1 to 5 wt-% calcium carbonate.

In one embodiment, at least one of the fibrous layers, such as the first and/or the second fibrous layer comprises barrier agents selected from the following group: dispersion polymers, polyolefins, polyesters, other thermoplastic polymers, biodegradable polymers, such as polylactic acid, starch and its derivatives, plastomers, elastomers, ethylene vinyl alcohol, and any derivatives, co-polymers and mixtures thereof.

In one embodiment, at least one of the fibrous layers, such as the first and/or the second fibrous layer comprises 0.1 to 15 wt-%, such as 0.1 to 10 wt-%, such as 0.1 to 5 wt-% barrier agents, such as dispersion polymer barrier agents. Such barrier agents typically provide said barrier properties throughout the structure of the fibrous layer, particularly in the absence of any refining.

In one embodiment, at least one of the fibrous layers, such as the second fibrous layer comprises 0.1 to 5 wt-% polymeric latex binders, such as styrene butadiene latex, styrene acrylate latex, polyvinyl acetate latex.

In one embodiment, at least one of the fibrous layers, such as the second fibrous layer comprises 0.1 to 15 wt-%, such as 0.1 to 5 wt-% polyvinyl alcohol (PVA).

In one embodiment, at least one of the fibrous layers, such as the second fibrous layer comprises 0.1 to 20 wt-%, such as 0.1 to 5 wt-% starch.

The starch may be native, modified, cooked or swelled cationic starch.

In one embodiment, one of the fibrous layers, such as the second fibrous layer comprises 0.1 to 5 wt-% CMC.

In one embodiment, at least one of the fibrous layers, such as the second fibrous layer comprises 0.1 to 20 wt-% mineral fillers.

In an embodiment, the fibrous layers of the product comprise less than 5 wt-%, such as less than 1 wt-% mineral fillers.

In one embodiment, all or at least one of the fibrous layers, such as the second fibrous layer comprises 0.1 to 20 wt-% strengthening additives, such as nanocellulose or microfibrillated cellulose (MFC) or other strengthening cellulose-based material.

Preferably, the fibrous layers of the product comprise less than 5 wt-%, such as less than 2 wt-% of waxes, plastics and fluorochemicals. In one embodiment, the fibrous layers of the product comprise less than 2 wt-% of waxes. In one embodiment, the fibrous layers of the product comprise less than 2 wt-%, such as less than 1 wt-% of plastics. In one embodiment, the fibrous layers of the product comprise less than 2 wt-%, such as less than 1 wt-% of fluorochemicals. In some embodiments, the product is substantially free of waxes, plastics and fluorochemicals, particularly plastics.

For ovenable applications, the additives and the foaming chemicals may be selected among additives which are approved for use in food contact materials or packagings and which additionally are approved for ovenable food packagings intended for heating. Preferably, the additives are selected among those approved in: BfR XXXVI/2. Paper and Paperboard for Baking Purposes: https://bfr.ble.de/kse/faces/resources/pdf/362-english.pdf.

For products not intended for oven, the additives and the foaming chemicals may be selected more freely among all additives that are approved for use in food contact materials or packagings. The additives may even comprise water-based barrier additives.

The amount of the barrier additive may be in the range 1 to 15 wt-%, such as 1 to 10 wt-%, such as 5 to 8 wt-%, calculated from the total dry weight of the fibrous layer.

By 'food contact materials' it is referred to all materials and articles intended to come into contact with food, such as packaging and containers.

Preferably the present product complies with Regulation (EC) No 1935/2004.

In one embodiment, the first fibrous layer and/or the second fibrous layer comprises a size, such as modified rosins, waxes, oils, or polymers. An advantage of using a size is that undesired absorption of liquid and/or water and/or moisture into the foam formed structure may be reduced. Thus, moisture-resistance or water-resistance of the product is improved.

An example of a wax is alkyl ketene dimer (AKD). An example of an oil is alkenyl succinic anhydride (ASA). An example of a polymeric size is styrene acrylate emulsion (SAE).

A preferred size is AKD or a similar wax.

The sizes applicable in some embodiments of the present invention may be a cationic surface size or an anionic surface sizes. In addition to or as an alternative to these, some reactive sizes, such as alkyl ketene dimer (AKD), may be used as a surface size.

Suitable cationic sizes include cationic starches and starch derivatives as well as corresponding carbohydrate-based natural polymers. Of synthetic polymers, for example styrene/acrylate copolymers (SA), polyvinyl alcohols, polyurethanes and alkylated urethanes may be used.

Suitable anionic sizes include anionic starches and starch derivatives and corresponding carbohydrate-based natural polymers such as carboxymethylcellulose and its salts, alkyl celluloses such as methyl cellulose and ethyl cellulose. Synthetic polymers include: styrene/maleic acid copolymer (SMA), diisobutylene/maleic anhydride, styrene acrylate copolymers, acrylonitrile/acrylate copolymers, and polyurethanes and similar latex products containing the same chemical functionalities.

In one embodiment, the size comprises alkyl ketene dimer (AKD).

In one embodiment, the additives, such as pigments, binders, and sizes are compliant with ovenable products.

In some embodiments, the product has a dry grammage in the range of 5 to 900 g/m$^2$, for example in the range of 100 to 900 g/m$^2$, such as in the range of 200 to 400 g/m$^2$ or 400 to 600 g/m$^2$.

In one embodiment, the lowermost fibrous layer and/or the inner fibrous layers of the product has a dry grammage in the range of 80 to 400 g/m$^2$, such as 100 to 400 g/m$^2$, such as 230 to 270 g/m$^2$.

In one embodiment, the lowermost and the uppermost fibrous layers of the product each have a dry grammage in the range of 80 to 150 g/m$^2$.

In one embodiment, the inner fibrous layer of the product has a dry grammage in the range of 150 to 250 g/m$^2$.

In an embodiment, the density of the inner fibrous layer is larger than 100 kg/m$^3$.

In one embodiment, the second fibrous layer of the product has a dry grammage in the range of 10 to 150 g/m$^2$, such as 60 to 150 g/m$^2$, or for example 20 to 60 g/m$^2$, such as 30 to 50 g/m$^2$.

In some embodiments, the product may comprise 2 to 20 fibrous layers, such as at least three fibrous layers.

In some embodiments, the moulded multi-layered fibrous product further comprises a release layer as the uppermost layer of the product. The release layer is advantageous for example in baking applications, such as in bread pans. Further, the presence of a release layer may protect the fibres of the first and second fibrous layers from heat.

The product may comprise a non-fibrous release layer on top of the uppermost fibrous layer, such as the second fibrous layer, which release layer forms the uppermost layer of the product in use. In this case the product may comprise 1 to 10 fibrous layers, and preferably at least one of the layers exhibits barrier properties.

Typically, the non-fibrous release layer is configured to be in direct contact with the food or liquid and to facilitate releasing of the food or liquid from the product, such as a container, after being heated in the container.

In some embodiments, the product comprises an intermediate layer, such as a pre-coating layer, between the release layer and the second fibrous layer. The intermediate layer may comprise or consist of PVA, CMC, starch or combinations thereof.

An advantage of using an intermediate layer between the release layer and the fibrous layers is that mixing of the release layer material with the fibrous structure may be avoided.

The present method enables obtaining a smooth product surface, which reduces the amount of material needed in preparing a release layer.

For example, said release layer may comprise a silicone composition, such as a sprayable silicone composition. The silicone composition may comprise an emulsion or a solvent-free system.

The silicone composition may comprise cured modified silicone, which has a very low surface tension and good isolation effect. The modified silicone component may be cross-linked by a platinum catalyst. The product obtains a high temperature resistance.

The intermediate layer and the release layer are typically applied after the hot-pressing and then dried.

The dry grammage of the release layer may be in the range 0.5 to 2.5 g/m$^2$, such as less than 2.0 g/m$^2$.

FIG. 1 schematically illustrates a multi-layered fibrous product in accordance with at least some embodiments of the present invention. The product comprises a first fibrous layer 1, which is the lowermost fibrous layer, a second fibrous layer 2, which is the uppermost fibrous layer, and an inner fibrous layer 3 between the first fibrous layer 1 and the second fibrous layer 2. Additionally, the product comprises a non-fibrous release layer 5, which is the uppermost layer of the product, and an intermediate layer 4 between the non-fibrous release layer 5 and the uppermost fibrous layer 2 of the product. One or more of the fibrous layers 1, 2, 3 may exhibit barrier properties.

In another embodiment, the product comprises only one fibrous layer, such as the first fibrous layer 1, a non-fibrous release layer 5, and optionally an intermediate layer 4.

In yet another embodiment, the product does not comprise any release layer nor an intermediate layer.

In some embodiments, the product comprises no inner fibrous layer. In other embodiments, the product comprises one, two or three inner fibrous layers between the first fibrous layer 1 and the second fibrous layer 2.

The multi-layered product is preferably obtained so that all fibres to be included in the end structure undergo a foam forming process. In some embodiments, all fibres to be included in layers exhibiting barrier properties undergo a foam-forming process.

For example, at least the fibrous layer exhibiting barrier properties has been obtained by a foam forming method in a mould. Such a fibrous barrier layer may be any of the fibrous layers, such as the uppermost fibrous layer, the lowermost fibrous layer and/or one or more of the inner fibrous layers.

The advantage of foam forming is that lighter and bulkier product may be prepared. Additionally, a more homogeneous forming may be achieved. Use of foam enables facile preparation of multi-layered structures in a batch process, i.e. all layers may be formed in the same mould to form a multi-layered stack in the mould, which stack is then hot-pressed.

An advantage of dewatering the entire multilayer structure in the same mould is that inter-layer bonding may be enhanced also during the dewatering in comparison to dewatering the layers individually.

In some embodiments, in addition to foam-formed layers, the end product may further comprise water-formed layers. Such water-formed layer or layers may be formed in a separate process and combined with the foam-formed layer or the foam-formed multi-layered structure by hot-pressing. An advantage of water forming is that preparation of flat or planar structures is easy. In water-forming methods, the individual layers are typically formed and removed from the mould independently from each other. Separate moulds may be used. After being removed from the mould(s), the layers may be piled to a stack and joined to each other and/or to other layers by hot-pressing.

In one embodiment, the product comprises several fibrous layers that are prepared by water-forming processes and combined to each other and optionally additionally to at least one foam-formed fibrous layer. Advantageously, the foam-formed layer or layers constitute the uppermost and/or the lowermost fibrous layers of the product and advantageously exhibit the barrier properties.

Preferably the product is a three-dimensional moulded multi-layered fibrous product, obtained by using a mould comprising at least one three-dimensional, non-planar mould surface, wherein said product exhibits a three-dimensional shape conforming to the shape of said three-dimensional, non-planar mould surface.

For example, the product may have a shape of a cup, a plate, a bowl, a pan, a clam-shell or a tray.

Typically, the product is a food or liquid packaging or container or a food or liquid serving product, such as a cup for beverage or a food tray or plate or a baking pan or a disposable lasagne tray type product.

In some embodiments, the product is ovenable, such as ovenable to a temperature of at least 100° C., preferably to at least 220° C.

In some embodiment, the product is a micro-ovenable food or liquid packaging or container, such as a food tray.

In one example, the product is a container for baking, such as an ovenable pan.

The product may be used for packaging, storing, serving, cooking and/or heating of food or liquid or beverage.

More generally, the product may be used for packaging and storing any oil-containing and/or water-containing products.

The product may be a product intended to be used or located on greasy or oily and/or wet surfaces or in humid environments.

In the following we provide examples of multilayered product structures suitable for particular applications.

In one example, the uppermost fibrous layer of the product is a barrier layer, such as a water-resistant barrier layer. The product may be a berry package. The barrier function is to prevent wetting of the package and concomitant spoiling of the visual appearance of the package.

In one example, the uppermost fibrous layer of the product is a barrier layer, such as an oil and grease-resistant barrier layer. The product may be a package for greasy food. The barrier function is to prevent penetration of oil and grease into and through the package for example during transport or heating.

In one example, the lowermost fibrous layer of the product is a barrier layer, such as a moisture and/or water vapour barrier layer. The product may be a package for food, such as dry food. The barrier function is to prevent penetration of moisture and/or water vapour into the package for example during transport in tropical conditions.

In one example, the lowermost fibrous layer of the product is a barrier layer, such as a moisture and/or water vapour barrier layer. The product may be a package for food, such as frozen food. The barrier function is to prevent permeation of moisture from the frozen food through and out of the package, which would lead to drying of the product during storage in a freezer.

The moulded multi-layered fibrous product may be used as a food or liquid packaging or as a food or liquid serving product or as a baking product or as a part thereof.

One embodiment provides a product obtained by a following method.

In some embodiments, the product or at least one of its fibrous layers may be obtained by a method comprising the following steps: providing a fibrous slush comprising fibres; refining the fibres of the fibrous slush and/or adding barrier agents to the fibrous slush; turning the fibrous slush to a foamed composition; forming, such as shaping and pressing, the foamed composition in a mould; dewatering; and hot-pressing.

The barrier agent may alternatively be added in a later stage of the method, for example by applying a composition comprising a barrier agent to an already-formed layer, preferably a foam-formed layer.

In the method, a foamed composition comprising fibres, water, air and one or more foaming chemicals is first provided. The foam may further comprise fillers, additives, pigments, binders, barrier dispersions and sizing agents.

The foaming chemical, such as a surface-active agent used may be nonionic, anionic, cationic or amphoteric. A suitable amount of surface-active agent is approximately 150 to 1000 ppm by weight. Examples of anionic surface-active agents are alpha-olefin sulphonates, and of nonionic, in turn, PEG-6 lauramide. Particular examples include sodium dodecyl sulphate.

Typically, the bubble size (diameter) in the foam is approximately 10 to 300 μm, for example 20 to 200 μm, usually approximately 20 to 80 μm.

In one embodiment, a composition suitable for foaming is obtained by mixing fibre slush, which has a consistency of approximately 0.5 to 7% by weight (the amount of fibre in relation to slush weight), with a foam which is formed from water and a surface-active agent and the air content of which is approximately 10 to 90% by volume, for example 20 to 80%, such as 50 to 70% by volume, in which case a foamed fibre slush is generated having a fibre content of approximately 0.1 to 3% by weight.

The fibres may include all types of fibres from chemical and/or mechanical pulping, recycled fibres, broke fibres, agricultural waste streams, annual plant fibres, by-products, micro- or nano-fibrillated cellulose fibres and regenerated cellulose fibres, and combinations thereof.

In one embodiment, a moulded multi-layered fibrous product is obtained by a method comprising: forming a moulded multi-layered foamed structure from at least one foamed fibrous composition comprising cellulosic fibres, water, air and a foaming agent and optionally also barrier agents; dewatering the structure, preferably by applying a vacuum; and hot-pressing the dewatered structure to obtain the moulded multi-layered fibrous product. At least one of the fibrous layers of the multi-layered fibrous product exhibits barrier properties substantially throughout its structure.

In the present context, "forming", typically foam forming, refers to the process of giving the foamed composition a shape, such as a three-dimensional shape, in a mould.

In the preferred method, a foamed fibrous composition is fed to a mould, typically to a cavity in a mould. The mould typically comprises a cavity or an inner space defined by mould inner surfaces. In the cavity the fed foamed composition is shaped. The cavity may have a dimension, such as the shortest dimension, in the range 0.1 to 100 mm, such as 5 to 100 mm, preferably 5 to 60 mm, in the closed configuration of the mould.

The foamed composition may be fed to the mould to provide an amount of the foamed composition, such as a layer of the foamed composition, onto at least one inner surface of the mould. The layer is typically non-planar and may be understood as a thickness, such as a substantially constant thickness, of the foamed composition lying on the inner surface of the mould and conforming to the shape of said surface.

Typically, the shaping step comprises pressing said fibrous composition in the inner space of the mould by making parts of the mould to approach each other.

The step of forming a multi-layered foamed structure may comprise feeding a first fibrous composition in a foamed form into the mould, and shaping said first fibrous composition in the mould, to prepare a first foamed fibrous layer. Thereafter, without removing the first fibrous layer from the mould, the process is continued by feeding a second fibrous composition in a foamed form into the mould, and shaping said second fibrous composition in the mould, to prepare a second foamed fibrous layer. As a result, a two-layered moulded foamed structure is obtained in the mould.

If not otherwise stated, by "parts of the mould" it is referred to such parts of the mould that serve to define the inner space and thus contribute to shaping the foamed fibrous composition.

The second foamed fibrous layer may be fed and thus become located either on top of or alternatively under the first foamed fibrous layer in the mould. Also, said feeding steps may be carried out in either order: either the first layer or the second layer may be formed first into the mould.

It may also be envisaged that the product is obtained by using separate moulds for preparing said first and second foamed fibrous layers, and the obtained first and second fibrous layers are joined in said hot-pressing step.

In one embodiment, said feeding into the mould comprises feeding the foamed fibrous composition in a foamed form into an inner space or inner volume of the mould, wherein said inner space is limited by inner surfaces of the mould.

Application of vacuum in the dewatering step is preferably enabled.

The final multi-layered foamed structure is removed from the mould by opening the mould.

Adjusting the distance between the parts of the mould during feeding and shaping of the foamed compositions is preferably enabled.

Before starting to feed a further, such as a second fibrous composition into the mould, it is typically necessary to enlarge the inner space of the mould by moving the parts of the mould farther from each other. The volume of the inner space may be diminished or enlarged to shape the already-fed foam and, respectively, to make room for the foam to be fed next.

In all adjustments of the volume of the inner space of the mould, some parts of the mould may remain stationary while other parts are moved.

In one example, one or more parts of the mould remain stationary and one or more other parts of the mould move during said approaching or during said enlarging.

For example, the mould may comprise two submoulds, such as two halves, that are arranged to face each other and to be movable with regard to each other. The submoulds may be approached towards each other to shape the product. The submoulds may be moved apart from each other to enlarge the inner space or even farther to open the mould and to remove the shaped product from the mould.

In one example, the product is obtainable by using a mould comprising two parts: a negative mould and a positive mould, which may be arranged to face each other to encase an inner space, also referred to as a moulding space or moulding cavity, between the two parts. The composition to be moulded or shaped is fed into the moulding space and the negative mould and/or the positive mould are approached toward each other to give the composition the shape corresponding to the shape of the moulding space. By 'approaching' it is referred to a process in which the inner space is diminished by means of moving one or both of the positive and negative moulds.

Dewatering of the structure may be carried out by applying vacuum to the inner space of the mould containing the fed foamed composition(s).

The dewatering step precedes the hot-pressing step, which hot-pressing leads to the final, typically dry product in which all layers have been joined to each other. In the hot-pressing, the temperature is typically higher than room temperature, for example at least 50° C., such as at least 100° C., for example in the range at least 150 to 240° C.

The hot-pressing may comprise two successive steps of hot-pressing.

During hot-pressing, heat may be applied from one or both sides of the material to be pressed.

For example, the hot-pressing may involve two hot-pressing steps in both of which heat is applied from the same side. Alternatively, the hot-pressing may involve two hot-pressing steps in which heat is applied from different sides.

Hot pressing may contribute to development of the barrier properties, for example via chemical reactions taking place in elevated temperature, such as cross-linking and curing reactions. Therefore, hot pressing may be advantageous when using barrier chemicals, such as AKD.

EXAMPLE

In the following we describe an embodiment in which the product is obtained by using a mould consisting of two parts, which are referred to as a pair of moulds.

Any of the features and combinations of features described below can be combined with the embodiments and alternatives described earlier in this application.

The method is for forming a moulded fibre product. In the method, a layer is formed of foam. The layer is a part of the final product. The foam, also referred to as 'foamed composition', includes fibres, water, air and one or more foaming chemicals. The foam may also comprise for example fillers and other normal paper-making chemicals, such as additives, pigments, colorants and binders.

Fibres may include all types of cellulosic and/or lignocellulosic fibres from chemical and/or mechanical pulping, recycled fibres, broke, by-products, micro- or nano-fibrillated cellulose and regenerated fibres and combinations thereof.

The recipe for a single foam layer may consist of a freely selected mixture of the before-mentioned raw materials. Naturally, recipes for different layers may vary from each other.

The layer is formed by a pair of moulds. The moulds may consist of several partial moulds, each for one product.

In principle, one mould is a negative mould while the other one is a corresponding positive mould. In this way, during the forming the layer obtains a three-dimensional shape. The water and air of the foam must be removed. This is done mainly by decreasing the distance between the moulds and by exerting pressure. The pressure forces air and water out of the foam that was fed between the moulds. The porous surfaces (product surfaces) of the moulds arrange the way out for water and air while the fibres remain and form the layer.

Foam may be fed via one of the moulds. The moulds are a distance apart from each other, and there is a closed cavity for foam. In this way, the feeding of the foam is quick, and the timing may be selected more freely.

Foam may also be fed via both moulds.

In this example, the pair is formed of an upper mould and a lower mould, and the upper mould is movable while the lower mould is arranged stationary. Foam is fed via the lower mould.

Foam can be fed when the pair is a distance apart from each other or when the pair is moving with respect to each other. This shortens the forming cycle. For example, foam may be fed even if the upper mould is moving upwards. On the other hand, the pair may first be moved apart from each other and only thereafter is the foam feeding started.

Feeding the foam through the mould provides a further advantage. Now it is possible to form not only a single layer but multiple layers, via a layer-by-layer process. The formed layer may be removed from inside of the pair after the forming. Alternatively, after the layer has been formed, the pair may be moved apart from each other and more foam may be fed for a further layer, and then the pair is approached towards each other again. Also here, foam may be fed even already when the pair is being moved apart from each other.

In practice, 1 to 10 further layers, advantageously 2 to 4 further layers may be formed. After forming and pressing, the air and unbound water is removed and the semi-finished product is obtained.

The next stage is hot-pressing for removing the water bound to the fibres. The layers finally stick together in the hot-pressing stage. Additionally, barrier properties may arise and/or develop in elevated temperatures.

Surprisingly, after the first layer, the further layer may be formed on either side of the fibre product. In other words, foam may be fed to either side of the previous layer. For example, one inner layer may be formed first to serve as a body layer, and then one further layer may be formed on both sides of the inner layer to serve as surface layers.

Thus, there will be three layers in total.

A multi-layered product may be prepared also in another way. The product may be combined of multi-layered partial products obtained from two separate mould pairs. The formed partial products from these two pairs may be combined and hot-pressed to obtain a single product. For example, in one pair, one inner layer with one bottom layer may be formed. Simultaneous in the other pair, one inner layer with one top layer may be formed. When combining these layers, a product with four layers is formed.

Forming several layers quickly, to constitute a single product, is a great benefit. The foam may be exchanged before forming the further layer or layers after the first layer. Foams with different properties may be used in forming one product. In this way, the layers may differ from each other. The product may include, for example, one or two inner layers formed from one kind of foam. Then there may be at least one outer layer of another kind of foam. Thus, foams may alter in cross-sectional profile of the product.

Surprisingly, the fibre product may be formed without extra heating. Since the foam has a low water content and contains a lot of air, water may be efficiently removed, and the product keeps its form after forming. Simultaneously, the foam stays in shape and power consumption is low.

The temperature of the foam is maintained in the range 15 to 45° C., advantageously in the range 25 to 35° C. If necessary, the foam and/or the moulds may be cooled to keep the temperature stable and low enough.

In such low temperatures, the fibres of the products will still contain some moisture. During the hot-pressing, the moisture is driven out as water and steam, which also provides a smooth surface and contributes to inner bonding to form a solid layered product. Additionally, barrier properties may arise and/or develop in elevated temperatures applied in hot-pressing.

Immediately as the pair starts to move apart from each other, foam is fed into the mould inner space. When the pair is approached towards each other again, the feeding stops and water is drained out of the pair. Simultaneously air becomes removed.

Water and air removal by pressing may be aided by vacuum.

Although a single-layer product may be formed, the method is advantageous when forming multiple layers.

Foam is made of water, air, fibres and foaming chemical. Foam contains small fractions or particles of the fibres in question. Also, a foaming chemical is used to aid foam generation and to keep the foam in shape.

The fibres may vary extensively as to their origin and composition. For example, wood fibres or vegetable fibres (for example straw, bagasse and bamboo fibres) may be used, but also man-made cellulosic fibres are possible.

In a proper foam, water and fibres and possible additives are evenly distributed on the bubble walls of the foam. The foam is a non-flocculating heterogeneous fibrous raw material in which the air of the bubbles carries the fibres and any other raw materials to the forming process. When using foam, the retention of the fibres is also very high. In practice, more than 99% of the fibres remain in the product formed from the thick foam as a carrier medium.

The additives may have different retention properties according to the purpose. Retentions aids may be added.

By forming the fibre product of several layers, the properties of the product may be tailored in many ways. For example, the basic structure and the surface properties of the product may be formed with different foam compositions. In practice, each layer may have its own process parameters and raw materials. For example, the rigid body of the product may be formed from cheaper fibres and then the surface layers from higher-quality fibres. Compared to the known processes using an aqueous fibre slurry, in foam the fibre density is much higher. Simultaneously, the amount of water within the bubble walls circulating is also considerably smaller and the water removal in the forming is easy. Foam with small water volumes enables fast process cycles.

The exchange of foam fractions or types for different layers of the product may be possible.

The foam may be fed rapidly enough inside the mould space, especially when vacuum is used.

In a proper foam the bubbles are not separated and the fibres are evenly distributed. During the forming, the foam is dispensed or fed into the mould inner space between the two moulds. The volume of the mould inner space may be adjusted according to the layer thickness required.

For example, the forming of the next layer may take place on either side of the previous layer. Also, foam feeding may start already during the moving apart of the pair. This is advantageous since during the moving apart, the mould space is immediately filled with foam without any air being able to enter the space before the foam.

The foam is fed through the mould, into the mould inner space. 'The mould inner space' refers to the space between the pair of moulds.

Also vacuum may be used. Vacuum aids water and air removal. Vacuum may be applied even during foam feeding, but at the latest when the approaching of the pair towards each other is started. During the forming, the mould space diminishes, but not as much as in the actual pressing step after the forming. In addition, it is possible to keep the formed layer under vacuum on the surface (inner surface) of the desired mould to form the further layer on the selected side of the earlier layer.

The forming may be carried out without any heating, to control the optimal foam structure for a uniform formation of the product. In practice, the forming is carried out in a substantially constant process temperature, advantageously between 15 to 45° C. In addition to the pair of moulds, this temperature may also be maintained in the entire foam system to ensure an optimal bubble size for high product quality. In this way the life-time of the foam may be extended. Also, it is easier to remove air than steam, and the layer remains unharmed and the process stable. In practice, the foam includes more than 50% air, advantageously 55 to 75% air.

The bubble size of the optimal foam in the forming may be about 10 to 500 μm in diameter, preferably 50 to 150 μm in diameter.

Surprisingly, the present foam process simultaneously achieves high consistency and good formation compared to known aqueous slurry formation processes. Said water-based processes require a longer heating and dewatering time as the consistency is much lower, and formation is poorer due to flocculation.

The layered product is formed as layers on top of each other, and the pressing and dewatering take place through an eventual below-lying previous layer and through the mould. The layer structure is bound together at the latest in hot-pressing.

The layered product may be formed in an optional layer order. In other words, the forming may start from any of the inner layers or from either of the surface layers.

The bonding of the layers to each other is ensured by dewatering through the layer interfaces.

Layer bonding continues in the subsequent hot-pressing step in which the heat and the steam generated in the product and the steam driven through the layers also strengthen the bonding of the layers to each other. During the hot-pressing step, barrier chemical(s) may become distributed further and/or more evenly within the fibrous layer or layers.

Layering may be carried out with the same fibres, but different additives may be used in different layers.

The hot-pressing may comprise a plurality of separate hot-pressing stages. Hot air or radiation heating or impulse drying, preferably impulse drying, may be applied to hot-press and/or dry the product.

After the hot-pressing step, an optional additional drying step in elevated temperature may follow, for example in order to cure additive chemicals, such as barrier agents, for example AKD. Such additional drying is also advantageous if the product comprises a non-fibrous release layer, which typically comprises silicone.

The method includes generating a foam from fibres, water, air and a foaming chemical. The properties of the foam may vary as earlier described. In addition, the method includes using a pair of moulds with mutual distance variability. In other words, the distance between the moulds, i.e. the volume of an inner cavity, may be varied. In practice, after feeding the foam, the moulds are pressed together for removing water and air, thereby forming the product.

In addition, the method further includes feeding foam between the moulds to form a layer. A single layer may constitute the product, but advantageously the product may include several layers. Foam may be fed even when the moulds are a distance apart from each other and also upon moving the pair relative to each other. This shortens the process cycle and gives more options in tailoring the process and the product.

The method involves creating a closed mould space, and feeding a volume of foam into the mould space, which is like a closed cavity. The product is removed from the pair and transferred to the hot-pressing.

Advantageously, the pair includes an upper mould and a lower mould. The upper mould is movable while the lower mould is arranged stationary.

With the closed mould space, the moulds may be a distance apart from each other during the forming. After being moved apart, the pair gives space for further foam.

In practice, the distance between the moulds is 10 to 100 mm, preferably 20 to 60 mm. Generally, the thicker the layer, the larger the distance. The flow rate of the foam keeps moderate. In practice, the flow rate is 1 to 3 meters per second.

As mentioned earlier, several identical products may be obtained in parallel by a forming method in which each mould of the pair comprises several identical partial moulds or sub-moulds.

Each partial or sub-mould is evenly filled with foam. Thus the products are uniform, and the process is quick.

After the mould space is filled with foam, water and air are removed by pressing. Water and air may permeate through the mould surface while the fibres accumulate on the mould surface. Water removal may be aided with vacuum. Water removal may also be aided by overpressure exerted by the opposing mould.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The present invention is industrially applicable at least in the manufacturing of multilayered moulded fibrous products.

ABBREVIATIONS

BCTMP bleached chemithermomechanical pulp
MFC microfibrillated cellulose
NFC nanofibrillated cellulose

REFERENCE SIGNS

1 first fibrous layer
2 second fibrous layer
3 inner fibrous layer
4 intermediate layer
5 non-fibrous release layer

The invention claimed is:

1. A moulded multi-layered fibrous product comprising:
a first fibrous layer comprising a cellulosic fibrous material; and
a second fibrous layer on top of the first fibrous layer, the second fibrous layer comprising a cellulosic fibrous material;
wherein the second fibrous layer exhibits barrier properties substantially throughout its structure,
wherein the cellulosic fibrous material of the second fibrous layer comprises cellulosic fibres which have been refined to a Schopper-Riegler number that is larger than 40, and
wherein the cellulosic fibrous material of the first fibrous layer comprises cellulosic fibres that are unrefined or which have been refined to a Schopper-Riegler number that is less than 40.

2. The moulded multi-layered fibrous product according to claim 1, wherein the first fibrous layer forms a lowermost fibrous layer of the product and the second fibrous layer forms an uppermost fibrous layer of the product.

3. The moulded multi-layered fibrous product according to claim 1, wherein the second fibrous layer is configured to be in direct contact with food or liquid.

4. The moulded multi-layered fibrous product according to claim 1, wherein the barrier properties include one or more members selected from the group consisting of: oil and grease resistance, water resistance, water vapour resistance, aroma resistance, gas resistance, and oxygen resistance.

5. The moulded multi-layered fibrous product according to claim 1, wherein the second fibrous layer is oil and grease-resistant substantially throughout its structure.

6. The moulded multi-layered fibrous product according to claim 1, wherein the second fibrous layer is water-resistant and/or water vapour-resistant substantially throughout its structure.

7. The moulded multi-layered fibrous product according to claim 1, wherein the cellulosic fibrous material comprises one or more members selected from the group consisting of: chemical wood pulp, mechanical wood pulp, fibrillated cellulose, microfibrillated cellulose, nanocellulose, and any other cellulosic material comprising cellulosic fibres or parts of cellulosic fibres.

8. The moulded multi-layered fibrous product according to claim 1, wherein the cellulosic fibrous material of the first and/or the second fibrous layer comprises bleached or unbleached chemical pulp.

9. The moulded multi-layered fibrous product according to claim 1, further comprising, between the first and the second fibrous layers, one or more inner fibrous layers, each inner fibrous layer comprising a cellulosic fibrous material comprising mechanical pulp.

10. The moulded multi-layered fibrous product according to claim 1, wherein the second fibrous layer comprises refined softwood and/or hardwood chemical pulp, and the first fibrous layer comprises softwood and/or hardwood chemical pulp.

11. The moulded multi-layered fibrous product according to claim 1, wherein the second fibrous layer forms an uppermost fibrous layer of the product and has a higher oil and grease resistance, a higher water-resistance, and/or a higher water vapour-resistance than the fibrous layer below it.

12. The moulded multi-layered fibrous product according to claim 1, wherein the first fibrous layer forms a lowermost fibrous layer of the product and has a higher water-resistance and/or a higher water vapour-resistance than the fibrous layer above it.

13. The moulded multi-layered fibrous product according to claim 9, wherein the Schopper-Riegler number of the one or more inner fibrous layers of the product is less than 50.

14. The moulded multi-layered fibrous product according to claim 1, wherein the density of the second fibrous layer is larger than the density of the first fibrous layer, and wherein the density of the second fibrous layer is in the range 300 to 1000 kg/m$^3$, calculated as dry solids weight per volume.

15. The moulded multi-layered fibrous product according to claim 9, wherein the density of one or more inner fibrous layers of the product is less than 500 kg/m$^3$.

16. The moulded multi-layered fibrous product according to claim 1, wherein at least one of the first and second fibrous layers comprises one or more additives selected from the group consisting of: pigments, colorants, fillers, talc, clay, kaolin, ground calcium carbonate, precipitated calcium carbonate, titanium dioxide, barrier agents, latex binders, water-soluble binders, polyvinyl alcohol (PVA), starch, carboxymethyl cellulose (CMC), alkyl ketene dimer (AKD).

17. The moulded multi-layered fibrous product according to claim 1, wherein the second fibrous layers comprises one or more barrier agents, which provide said barrier properties substantially throughout the structure of the fibrous layer.

18. The moulded multi-layered fibrous product according to claim 1, wherein each of the fibrous layers of the product has been obtained by either foam forming or water forming in a mould.

19. The moulded multi-layered fibrous product according to claim 1, wherein at least the second fibrous layer has been obtained by a foam forming method in a mould.

20. A moulded multi-layered fibrous product comprising:

a first fibrous layer comprising a cellulosic fibrous material; and a second fibrous layer on top of the first fibrous layer, the second fibrous layer comprising a cellulosic fibrous material;

wherein the first and/or the second fibrous layer exhibits barrier properties substantially throughout its structure, wherein the cellulosic fibrous material of the second fibrous layer comprises cellulosic fibres which have been refined to a Schopper-Riegler number that is larger than 40, wherein the cellulosic fibrous material of the first fibrous layer comprises cellulosic fibres which either are unrefined or have been refined less than the refined cellulosic fibres of the second fibrous layer, and wherein the density of the second fibrous layer is larger than the density of the first fibrous layer.

* * * * *